Dec. 19, 1939. E. HARPER Re. 21,303

ASHTRAY AND CIGARETTE EXTINGUISHER

Original Filed Nov. 21, 1933

Inventor

Ewing Harper,

By Chunt & Chunt

His Attorneys

Reissued Dec. 19, 1939

Re. 21,303

UNITED STATES PATENT OFFICE 21,303

ASHTRAY AND CIGARETTE EXTINGUISHER

Ewing Harper, San Francisco, Calif.

Original No. 2,093,657, dated September 21, 1937, Serial No. 699,043, November 21, 1933. Application for reissue September 17, 1938, Serial No. 230,514

9 Claims. (Cl. 131—235)

This invention relates to improvements in ashtrays and cigarette extinguishers.

The object of the invention is to produce a combined cigarette extinguisher and ashtray which can be easily taken apart to facilitate cleaning and washing the same.

Another object is to provide a sectional cigarette extinguisher wherein one or more restricted passages are formed in which cigarettes may be placed and where, due to the lack of oxygen, they will be extinguished.

A still further object contemplated is the provision of a combined ashtray and cigarette extinguisher wherein the ashes and extinguished cigarettes are retained in a substantially concealed reservoir whereby the article will, at all times, present a clean appearance.

With these and other objects in view the invention consists of certain details of construction and combinations and arrangements of parts, all as will hereinafter be more fully described and the novel features thereof particularly pointed out in the appended claims.

In the accompanying drawing, Fig. 1 is a top plan view of a combined cigarette extinguisher and ashtray illustrating the preferred embodiment of the invention;

Figure 1:
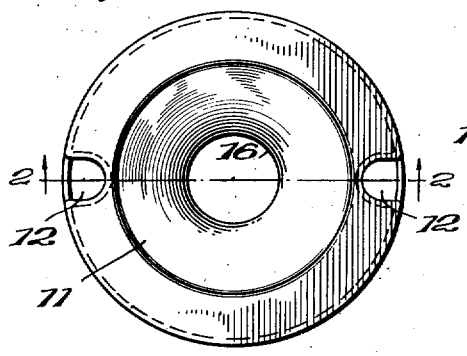
Figure 2:
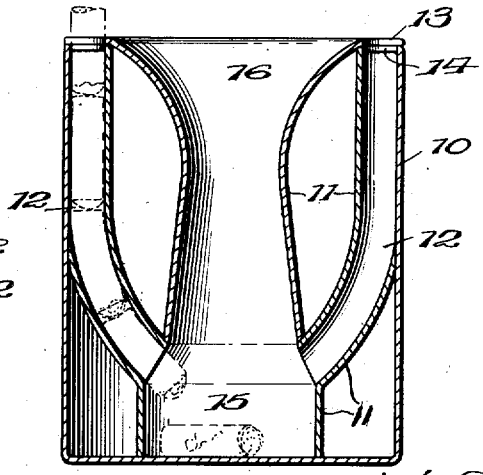
Fig. 2 is a vertical section on the line 2—2 of Fig. 1.

In the tray illustrated in Figs. 1 and 2, there is an outer member or casing 10 and an inner member 11, the member 11 being so arranged within said member 10 that one or more restricted passages 12 are formed between the walls of the two members. The members 10, 11 may be made of any desired cross-sectional shape, being circular in the present instance.

The purpose of the restricted passages is to smother or extinguish cigarettes inserted therein. If desired, one passage extending continuously around the tray may be provided but in the preferred construction a plurality of circumferentially spaced passages are formed by vertically extending indentations or recesses in the exterior surface of the inner member 11. Each passage is of such width that a lighted cigarette inserted burning end first in any passage will be extinguished by reason of there being an insufficient supply of oxygen.

As shown, more particularly in Fig. 2, inner member 11 is formed with a peripheral flange 13 by which said member is supported on a ledge 14 at the top of member 10. Member 11 preferably extends to the bottom of member 10 and forms a fairly large reservoir 15 for the reception of the extinguished cigarettes, the passages 12 communicating with said reservoir. Member 11 is also formed with a central bore or passage 16 through which ashes may be deposited in the reservoir. Member 11, for convenience in manufacture, may be made in several sections which are preferably united, as by soldering, so that the entire member may be withdrawn as a unit from outer member 10 when it is desired to clean the interior of the latter.

The contour of passage 16 is such that the reservoir is concealed so that the article will have a clean appearance until it is practically filled with cigarettes and ashes.

Figure 3:
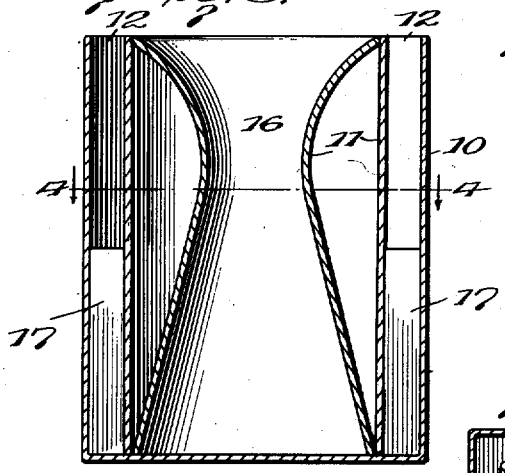
Fig. 3 is a vertical sectional view illustrating a modified form of construction.
Figure 4:
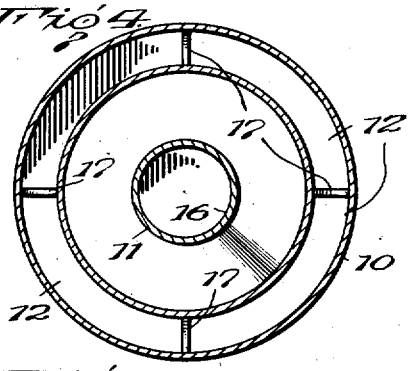
Fig. 4 is a sectional view on the line 4—4 of Fig. 3.

In the form of the invention illustrated in Figs. 3 and 4, the inner member 11 rests on the bottom of member 10 with the side walls of the two members spaced apart to form one continuous circumferentially extending passage 12. The member 11 also has the central bore 16 for the reception of ashes. The two members are held in the desired spaced relation by vertically extending ribs or flanges 17 on one of the members—member 11 in the present instance. In this instance, the inner member may likewise be made of united sections to permit removal as a unit.

Figure 6:
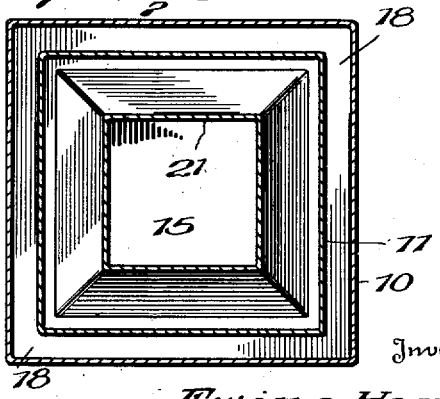
Fig. 6 is a transverse section on the line 6—6 of Fig. 5.
Figure 5:
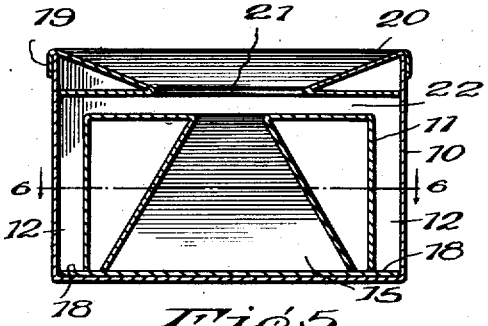
Fig. 5 is a vertical sectional view of still another form of tray.

Referring to Figs. 5 and 6 there is shown a tray of rectangular cross-section. In this embodiment, the inner member 11 is held in spaced relation to the side walls of member 10 by flange portions 18 at the base of the inner member. A top or cover 20, formed with a central aperture 21, projects over the top surface of member 11, forming a horizontal passage 22 which communicates with the passage 12 at the side. Said top is held in place by a depending flange 19 formed at the perimeter thereof and adapted to be placed over the upper edge of outer member 10. Lighted cigarettes forced in the restricted horizontal passage 22 will be extinguished and as successive cigarettes are inserted in said passage, previously inserted cigarettes will fall into passage 12. That is, the contour of the passage is such that each cigarette will be retained therein until advanced or dislodged by a succeeding cigarette. This retension of a lighted cigarette, causes the same to be smothered. Of course, it will be appreciated that, while these restricted passages are located in the side walls of the device in the constructions illustrated and such constructions are preferred, nevertheless the board principle involved is not limited to this specific location of the passages. Inner member 11 has a centrally located well or reservoir 15 in which ashes may be deposited.

In each instance, the inner member, as illustrated, is readily removable to empty ashes and cigarettes from the tray and to permit thorough washing and cleansing of the article, but the inner and outer members may be rigidly secured together, and in any event, the walls of passageways 12 are rigid, which passageways in Fig. 2, in particular, are elongated, open-ended tubes that prevent cigarette butts from falling through without being extinguished by reason of the fact that the lower ends of the tubes are curved to hold each butt at the curve until the following butts cause the butt at the curve to be forced therepast.

What is claimed is:

I claim:

1. In an article of the class described, the combination of inner and outer members, said outer member having a closed bottom and said inner member being loosely and removably supported in said outer member, portions of the walls of said members being spaced a fixed distance apart and forming restricted passages in which cigarettes are extinguished and held until advanced by a subsequently inserted cigarette and said inner member having an opening therein in which ashes may be deposited, the entire area of the inner surface of the bottom of the outer member being fully exposed when the inner member is removed.

2. In an article of the class described, an outer member closed at one end, an inner member loosely and removably supported within the outer member, portions of the walls of the two members having curved surfaces spaced apart a fixed distance to form restricted passages in which cigarettes are held to extinguish the same, and an ash reservoir in the closed end of the outer member, there being a passage through the inner member through which ashes may be deposited in said reservoir, the ashes in said reservoir and the cigarettes in said restricted passages being substantially concealed from view, the entire area of the inner urface of the bottom of the outer member being fully exposed when the inner member is removed.

3. In an article of the class described, an outer member having vertically arranged side walls and a bottom closure, an inner member positioned on the bottom of the outer member and formed with vertical side walls and an upper surface, the side walls of said members being spaced apart to form restricted passages for extinguishing cigarettes, and inwardly projecting portions on said outer member overhanging but spaced from the upper surface of said inner member and forming continuations of said restricted passages.

4. In an article of the class described, inner and outer members having vertically arranged side walls spaced laterally from each other, a bottom closure for said article, and an inwardly extending flange at the upper extremity of each of said members, said flanges being spaced apart to form a constricted passage therebetween, said constricted passage constituting a continuation of the space between the side walls of said members, whereby lighted cigarettes inserted in the constricted passage will be extinguished therein and forced into said space by subsequently inserted cigarettes.

5. In an article of the class described, a receptacle comprising inner and outer members having portions of their respective surfaces spaced apart to form a constricted passage, said passage being curved whereby a burning cigarette inserted therein will be frictionally retained and smothered therein, said receptacle having an ash reservoir therein with which one end of said passage communicates, each cigarette being discharged from said passage into said reservoir by a subsequently inserted cigarette.

6. In an article of the class described, a receptacle comprising inner and outer members having portions of their respective surfaces spaced apart and forming an elongated, constricted passage, the cross-sectional area of said passage being such as to smother a burning cigarette inserted therein, and said passage being curved longitudinally to retain a cigarette therein until advanced therethrough by a subsequently inserted cigarette.

7. In an article of the class described, a receptacle comprising inner and outer members, the inner member being loosely and removably supported by the outer member, portions of the surfaces of said members being spaced a fixed distance apart to form a permanent passage open at its opposite ends in which a burning cigarette may be inserted, the cross-section of said passage being such as to frictionally retain a burning cigarette therein until advanced therethrough by a subsequently inserted cigarette, said passage being of sufficient length to substantially conceal the burning cigarette retained therein, and an ash reservoir in said receptacle.

8. In an article of the class described, the combination of inner and outer members, said outer member having a closed bottom and said inner member being loosely and removably supported in said outer member, portions of the walls of the two members being spaced a fixed distance apart and forming an elongated restricted passage between the two members in which cigarettes are successively inserted from one end and held and extinguished, said article having an ash reservoir therein with which the opposite end of said passage communicates whereby the extinguished cigarettes are discharged from the passage into said reservoir.

9. An article of the class described, comprising a body member forming a main ash receiving receptacle, an elongated tubular, open-ended passageway, opening at one end into said receptacle and the opposite end opening outwardly thereof and of a cross-sectional area adapted to pass a cigarette butt therethrough from said opposite open end for discharge from said one end directly into the receptacle, said passageway being curved longitudinally at a point in the length thereof to obstruct the free passage of said cigarette butt past said curve at said point for snuffing the butt at said point until the butt is advanced to said one end by a butt subsequently inserted in said opposite end.

EWING HARPER.